United States Patent [19]

Frank et al.

[11] 4,020,266
[45] Apr. 26, 1977

[54] ORIENTED CRYSTALLIZATION OF POLYMERS

[76] Inventors: Frederick Charles Frank, Orchard Cottage, Grove Road, Coombe Dingle; Andrew Keller, 41 Westbury Road, Westbury-on-Trym, both of Bristol 9; Malcolm Robert Mackley, Springfield Cottage, Richmond Dale, Clifton, Bristol 8, all of England

[22] Filed: Jan. 23, 1975

[21] Appl. No.: 543,355

[52] U.S. Cl. .......................... 528/498; 260/33.6 R; 260/33.6 UA; 260/78 S; 526/351; 526/352; 528/502

[51] Int. Cl.² .......................................... C08F 6/06
[58] Field of Search ........ 260/94.9 GD, 93.7, 78 S, 260/94.9 F; 264/9; 450/773, 775.5; 528/498, 502

[56] References Cited

UNITED STATES PATENTS

| 2,988,782 | 6/1961 | Parrish et al. | 18/48 |
| 3,431,242 | 3/1969 | Waters et al. | 260/67 |
| 3,743,272 | 7/1973 | Nowotny et al. | 264/69 |
| 3,882,095 | 5/1975 | Fowells et al. | 260/88.2 R |

Primary Examiner—Stanford M. Levin
Attorney, Agent, or Firm—Larson, Taylor & Hinds

[57] ABSTRACT

Crystalline polymer fibrils having a highly ordered crystalline core surrounded by less ordered crystalline polymer are produced by causing a solution of the polymer to flow through a gauze. The solution is at a temperature below the dissolution temperature of the polymer but above the temperature at which the polymer will crystallize spontaneously in an unstirred solution. The flow rate is selected in relation to the gauze dimensions to impart a sufficiently high longitudinal velocity gradient to the solution flowing through the gauze, preferably about $10^2 sec^{-1}$ or greater.

5 Claims, 6 Drawing Figures

ORIENTED CRYSTALLIZATION OF POLYMERS

FIELD OF THE INVENTION

This invention relates to the production of oriented polymer crystals. More particularly, the invention is concerned with the production of polymer crystal fibrils which comprise a highly ordered crystalline core surrounded by relatively less ordered crystalline polymer.

In such material, the core seems to be of extended chain structure and the surrounding material comprises transverse platelets of folded chain crystals. Polymer fibres made from such a material will tend to have a high modulus of elasticity, imparted by the extended chain core. Where the core is surrounded by transverse platelets of folded chain crystals, the resulting fibre is analogous in dimensions to cellulose fibres, with corresponding industrial applications.

BACKGROUND TO THE INVENTION

Crystallization of this kind has been achieved by vigorously stirring a solution of polyethylene in xylene at a suitable temperature, a fibrous deposit of the crystals being produced adhering to the stirrer. This method involved the production of turbulent flow during stirring. Other more controlled methods have also been tried. The present invention seeks to provide a new and more efficient method of producing these crystals.

SUMMARY OF THE INVENTION

According to the present invention there is provided a process which comprises causing a solution of a polymer to flow through a fine gauze at a suitable temperature and flow rate such as to produce crystallization of the polymer in the form of fibrils having an extended chain molecular core surrounded by folded chain molecular polymer of relatively lower melting point.

A suitable temperature for the solution will depend upon the polymer employed. It will generally be below the dissolution temperature of the polymer in the solvent, but above the temperature at which the polymer will crystallize spontaneously from the solution. For a solution of polyethylene in xylene it will typically be in the range of 90° C to 112° C.

BRIEF DESCRIPTION OF THE DRAWINGS

In order that the invention may be more clearly understood, it will be further exemplified with reference to the accompanying drawings, wherein.

DETAILED DESCRIPTION

Figure 1:
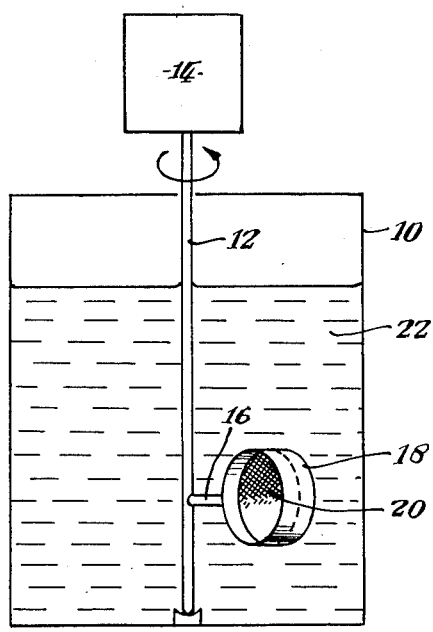
FIG. 1 shows a diagrammatic view of the crystallization apparatus.

Referring firstly to FIG. 1; the apparatus comprises a closed vessel 10 with means (not shown) for maintaining it at a required elevated temperature. Extending downwardly into the vessel is a spindle 12 driven by a motor 14, and having at its lower end portion within the vessel a radial arm 16. At its end the arm carries an open-ended sleeve 18 across the interior of which extends a fine stainless steel gauze 20. The vessel is charged with polymer solution 22, and the sleeve 18 is arranged so that on rotation of the spindle 12 the solution flows substantially axially through the sleeve.

In an experiment using this apparatus, a solution was made containing 1.5% by weight polyethylene (Marlex 6002 — Phillips Trade Mark) in xylene, this being the maximum concentration which was readily obtainable. 500 Ml. of this solution was introduced into the vessel and maintained at a temperature of about 106° C. The gauze was made up from stainless steel wires 0.02 mm. thickness and with 0.1 mm. spacing, giving 40% of the gauze area obscured by wire. The vessel 10 was 12 cm. in diameter, the arm 16 was 1 cm. in length, and the sleeve 18 was 2 cm. in diameter. The spindle was rotated at 24 r.p.m., giving an estimated fluid velocity outside the gauze of 2.5 cm. per second, and an estimated velocity through the gauze of 6.25 cm. per second, and an estimated longitudinal velocity gradient of 375 sec$^{-1}$ in the fluid along the axis of each opening in the gauze. These conditions were chosen to try and obtain a suitably high velocity gradient with substantially laminar flow of fluid in the region of the gauze.

Figure 2:
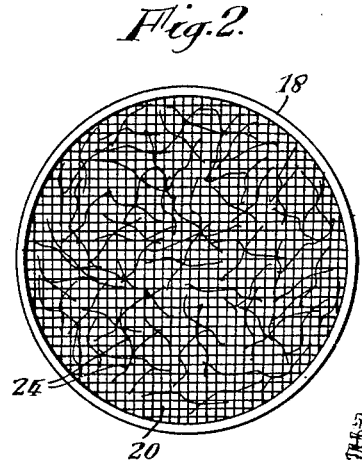
FIG. 2 shows a face view of the gauze on which crystals have been formed.
Figure 3:
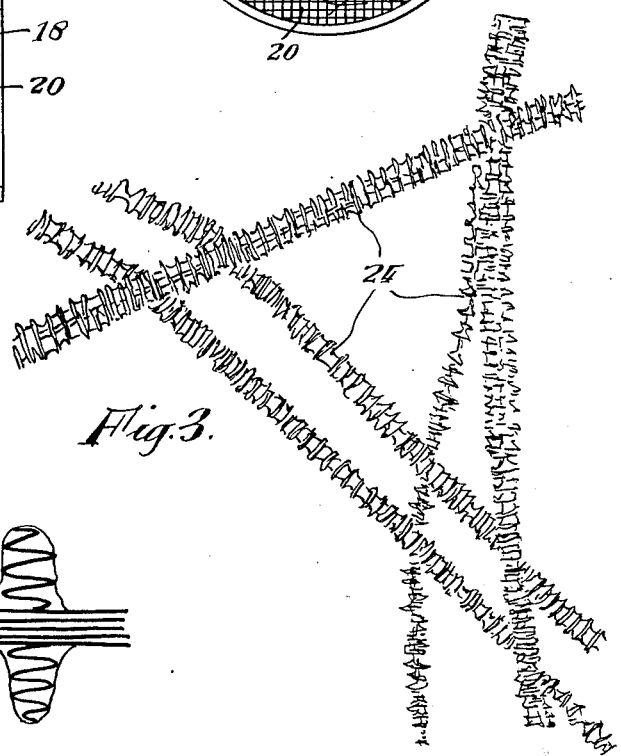
FIG. 3 shows the appearance of the crystals under the electron microscope.
Figure 4:
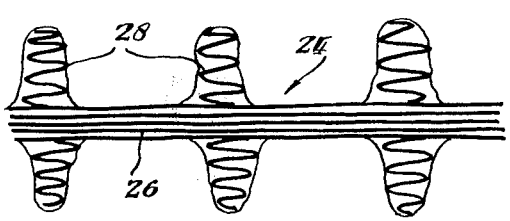
FIG. 4 shows diagrammatically the probable molecular structure of part of a fibril.

When the gauze was removed from the apparatus and examined, a network of fibrils 24 were seen to have formed on the gauze, as shown in FIGS. 2 and 3. In the enlargement of FIG. 3, it will be seen that each fibril consists of a central core from which extend transverse platelets. This is represented diagrammatically in FIG. 4, where the core is shown at 26 and the platelets at 28. Tests on the material indicated the presence of two modes of crystallization. The core is believed to be more hightly ordered and made up from extended polymer chains, and is therefore represented as a series of parallel straight lines, whereas the platelets are thought to be relatively less ordered and made up from folded chains, and are therefore represented as zig-zag lines. The folded chain structure can be considered as the normal crystallization mode of the polymer, while the extended chain core is the result of the production of longitudinal velocity gradients in the solution at the point of crystallization.

Figure 5:
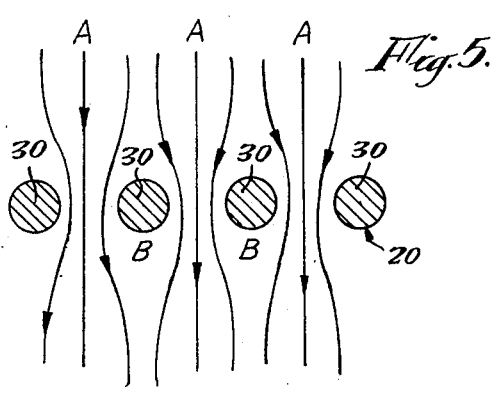
FIG. 5 shows an enlarged cross-section through part of the gauze, showing the velocity gradient.
Figure 6:
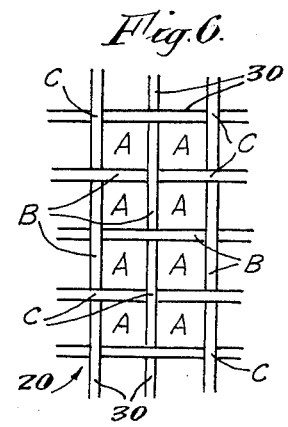
FIG. 6 shows a face view of part of the gauze, also indicating the positions of the velocity gradients.

A longitudinal velocity gradient of sufficient magnitude can extend the molecules appreciably, whereas transverse velocity gradients cannot. The existence of velocity gradients in the solution passing through the gauze is demonstrated in the diagrams of FIGS. 5 and 6, in which the gauze wires are shown at 30. In FIG. 5, the flow of the solution is shown by the arrows. Because of the venturi effect through the gauze openings, a longitudinal velocity gradient will occur on and near the axis A of each opening. Also, since the liquid will flow around each side of each gauze wire, the centre line on the surface of each wire on the downstream side will represent a line along which the solution is stationary, so that the solution will be subjected to a longitudinal velocity gradient from that line downstream, as indicated by the regions B in FIGS. 5 and 6. By a similar process, a longitudinal velocity gradient will exist in the solution on the downstream side of the gauze, starting from each intersection point of the gauze wires, as indicated by the arrows C in FIG. 6. The regions A and C, being essentially a series of axes, represent regions of uniaxial extension, while regions B, since they start from lines on the underside of the wires, represent planes of pure shear. In these regions A, B and C, appreciable molecular extension can be expected, so that if the flow rate and temperature are suitable, there is the possibility of nucleating a fibrous core crystal. When the core has formed, if there is further unoriented and uncrystallized polymer present, folded chain crystallization can occur on the nucleating threads to form the platelets. It seems most likely that the regions of uniaxial extension, A or C or both, are primarily responsible for the desired crystallization.

The velocity of the solution relative to the gauze must be sufficiently high to give the required longitudinal velocity gradient, which should be of the order of $10^2 sec^{-1}$ or greater. The dimensions and other characteristics of the gauze, and the concentrations of the solution can be varied to produce optimum results in each particular case. The temperature is also an important factor. In the case of polyethylene in xylene, 112° C represents the approximate dissolution temperature, 90° C to 112° C the approximate range in which the two types of crystallization can occur in a stirred solution, 70° C to 90° C the approximate range in which single platelet crystals will occur spontaneously in an unstirred solution, and below about 70° C multilayer platelet crystals are formed in an unstirred solution. Although the apparatus has been particularly described as mechanically moving a gauze through a stationary solution, the principle applies equally to flowing the solution through a stationary gauze.

Although the foregoing example refers to a solution of polyethylene in xylene, other polymers and solvents could be used. For example, polymers such as nylon or polypropylene should be equally suitable, in appropriate solutions. It has been found that high molecular weight material is more effective than low molecular weight material in producing this crystallization.

A 1.5% solution was prepared of a different polyethylene in xylene. In this case a very high molecular weight polymer was chosen (Hoechst "Hostalen" G.U.R.) having a weight average $M_w \simeq 1.5 \times 10^6$. The solution was put into the same apparatus as before and maintained at 100° C. The spindle was rotated at 60 r.p.m., and after 3 to 5 minutes fibrous crystals were visible on the gauze under an optical microscope. Examination under an electron microscope showed a detailed structure of the fibres similar to that obtained with Marlex 6002 and shown in the drawings.

The procedure was repeated using a 3.5% solution of polypropylene homopolymer in xylene. The polypropylene was I.C.I. "Propathene" GWE21, having a high molecular weight, as indicated by its low melt index (M.F.I. $\simeq 2$). A 3.5% solution was the maximum concentration easily obtainable. The dissolution temperature for this polymer in xylene is about 110° C. while spontaneous crystallization occurs below about 60° C. The solution was maintained at 85° C, and the spindle was rotated at 60 r.p.m. After about 10 minutes fibrous crystals were visible on the gauze under an optical microscope. Electron microscope examination was somewhat obscured by the crystals becoming charged, but the fibres had similar dimensions to the polyethylene fibres observed in the earlier tests.

We claim:

1. A process which comprises causing a solution of a synthetic crystallizable polymer, selected from the group consisting of polyethylene, nylon and polypropylene, to flow through a gauze at a temperature less than the dissolution temperature of the polymer in the solvent but above the temperature at which the polymer crystallizes spontaneously from the solution, and at a flow rate through the gauze producing a longitudinal velocity gradient in the solution, of the order of $10^2$ $sec^{-1}$ or greater, sufficient to produce crystallization of the polymer downstream of the gauze in the form of fibrils having an extended chain molecular core surrounded by folded chain molecular polymer of relatively lower melting point.

2. A process according to claim 1 wherein the polymer is polyethylene.

3. A process according to claim 2 wherein the polyethylene is dissolved in xylene.

4. A process according to claim 3 wherein a 1.5% by weight solution of polyethylene is used.

5. A process according to claim 3 wherein the solution passing through the gauze is at a temperature from 90° C to 112° C.

* * * * *